US005769640A

United States Patent [19]
Jacobus et al.

[11] Patent Number: 5,769,640
[45] Date of Patent: Jun. 23, 1998

[54] METHOD AND SYSTEM FOR SIMULATING MEDICAL PROCEDURES INCLUDING VIRTUAL REALITY AND CONTROL METHOD AND SYSTEM FOR USE THEREIN

[75] Inventors: Charles J. Jacobus; Jennifer Lynn Griffin, both of Ann Arbor, Mich.

[73] Assignee: Cybernet Systems Corporation, Ann Arbor, Mich.

[21] Appl. No.: 513,488

[22] Filed: Aug. 10, 1995

Related U.S. Application Data

[63] Continuation of Ser. No. 87,653, Jul. 6, 1993, abandoned, which is a continuation-in-part of Ser. No. 984,324, Dec. 2, 1992, Pat. No. 5,389,865.

[51] Int. Cl.$^6$ .................................................. G09B 23/28
[52] U.S. Cl. .......................................... 434/262; 434/272
[58] Field of Search ................................... 434/262, 267, 434/268, 272

[56] References Cited

U.S. PATENT DOCUMENTS 4,604,016  8/1986  Joyce ......................................... 414/7

OTHER PUBLICATIONS

Fritz, Mark, The World of Virtual Reality, Training, vol. 28 No. 2 pp. 45–50, Feb. 1991.

Miller, Carmen, ONLINE Interviews Dr. Thomas A. Furness III, Virtual Reality Pioneer, Online, Nov. 1992.

*Primary Examiner*—Richard J. Apley
*Assistant Examiner*—John Edmund Rovnak
*Attorney, Agent, or Firm*—Gifford, Krass, Groh, Sprinkle, Patmore, Anderson&Citkowski

[57] ABSTRACT

A method and system for simulating medical procedures is presented. During an actual medical procedure, the actions of a medical instrument are measured and recorded. These actions are generated on a member representative of the medical instrument to simulate the actual medical procedure. Forces acting upon the medical instrument are sensed and simulated in the member using a force/tactile reflecting mechanism. The preferred embodiment uses virtual reality technology including image processing, three-dimensional graphics and display methods, simulated force/tactile reflection, head/hand movement, position sensing, and sound generation to provide an accurate simulation of endoscopic medical procedures.

22 Claims, 5 Drawing Sheets

METHOD AND SYSTEM FOR SIMULATING MEDICAL PROCEDURES INCLUDING VIRTUAL REALITY AND CONTROL METHOD AND SYSTEM FOR USE THEREIN

CROSS-REFERENCE TO RELATED APPLICATION

This application is a continuation of application Ser. No 08/087,653, filed Jul. 6, 1993, now abandoned, which application is a continuation-in-part of U.S. application Ser. No. 984,324, filed Dec. 2, 1992, now U.S. Pat. No. 5,389,865.

TECHNICAL FIELD

This invention relates to methods and systems for simulating medical procedures for training and for remote control.

BACKGROUND ART

Laparoscopic surgery, a specific application of endoscopic surgery, is performed by:

(1) making several small openings into the peritoneal cavity 10 of the body 12 as shown in FIG. 1;

(2) insufflating with an inert gas, $CO_2$ (providing medium for adequate anatomical inspection);

(3) inserting a viewing scope 14 (laparoscope) into one opening 10;

(4) inserting other surgical instruments 16 into the other openings (i.e. staplers, cutting/cauterizing instruments, etc.); and (5) maneuvering and manipulating these instruments 16 on the basis of tactile feel and the visual information of the surgical site from the inserted viewing scope 14 (usually displayed on a TV monitor).

Because the feel of the instruments 16 and the imagery of the surgical site is restricted to a small local area which is not directly visible, surgeons must train extensively (usually on animals) prior to performing human procedures. This type of surgery is still very much an art rather than science.

Endoscopic and laparoscopic intervention is being fervently applied to procedures (such as cholecystectomies, hernia repair, nephrectomies, appendectomies, and numerous gynecological procedures) being praised for fast patient recovery time and decreased hospital and surgery costs. As new applications emerge, training will play a crucial role in technological adoption. A need exists for a training device which will facilitate the transition from more traditional open procedures to endoscopic procedures by fostering the surgical skill necessary for the execution of efficient and complication-free procedures.

U.S. Pat. No. 5,149,270, issued to McKeown, discloses an apparatus for practicing endoscopic surgical procedures. The apparatus has a cavity in which an object simulating a human organ is mounted for performing a practice procedure. The cavity is closeable to outside view, thereby forcing the individual practicing the procedure to use and manipulate the instruments relying only upon a viewing scope in an attempt to mimic the actual diagnostic and operating conditions. This configuration, by relying upon physical linkages and organ materials, lacks the versatility, robustness, and repeatability of a programmable simulation device.

International PCT application No. PCT/US92/02186, published 1 Oct. 1992, discloses an automated surgical system and apparatus. An endoscopic instrument and a viewing scope are controlled remotely via a control mechanism in communication with the surgical instruments over a telecommunications link. This device, while directed toward the remote control of surgical instruments, does not address the necessity of force feedback for giving the remote user the feel of actual surgical procedures. Further, the device is directed toward remotely performing actual surgical procedures rather than simulated surgical procedures for the purposes of training.

SUMMARY OF THE INVENTION

It is an object of the above invention to provide a method and system for simulating actual medical procedures.

A further object of the above invention is to provide a method for providing a virtual reality in response to a position and orientation of a member representative of a medical instrument.

Moreover, an object of the above invention is to provide a method and system for controlling a medical instrument.

An additional object of the above invention is to provide a four-axis controller for a medical instrument.

In carrying out the above objects, the present invention provides a method for simulating actual medical procedures which utilize at least one medical instrument. According to the present invention, the actions of the medical instrument are measured during an actual medical procedure. These measured actions of the medical instrument are generated on a member representative of the medical instrument so as to simulate the actual medical procedure.

In carrying out the above objects, the present invention further provides a system for simulating actual medical procedures which utilize at least one medical instrument. The system comprises means for measuring the actions of the medical instrument during an actual medical procedure. Means are also provided for generating the measured actions on a member representative of the medical instrument whereby the actions of the member simulate the actual medical procedure.

In carrying out the above objects, the present invention also provides a method for providing a virtual reality in response to a position and orientation of a member representative of a medical instrument. An electrical signal is generated for each of a plurality of degrees of freedom of the member as a function of the position and orientation of the member in three-dimensional space. At least one virtual reality force field is generated in response to the generated signals. A force signal is generated for each degree of freedom as a function of the force field. A force on the member is generated for each force signal, thus providing the virtual reality.

In carrying out the above objects, the present invention additionally provides a method for controlling a medical instrument. The position and orientation of a member representative of the medical instrument is measured. Actions are generated on the medical instrument based upon the measured position and orientation of the member. The forces acting upon the medical instrument are measured. Forces are generated on the member based upon the measured forces acting upon the medical instrument.

In carrying out the above objects, the present invention also provides a system for controlling a medical instrument. The system comprises means for measuring the position and orientation of a member representative of the medical instrument. Means are provided to generate actions on the medical instrument based upon the measured position and orientation of the member. The system further comprises means for measuring the forces acting upon the medical instrument. Means are provided to generate forces on the member based upon the measured forces acting upon the medical instrument.

In carrying out the above objects, the present invention also provides a four-axis controller for a medical instrument. The system comprises a member representative of the medical instrument. A four-axis interface device, which is responsive to the position and orientation of the member, is secured to the member. Electrical signals representative of the position and orientation of the member are generated in the four-axis interface device. Means for actuating the medical instrument in response to the electrical signals are included. Means for generating a force field based upon a force induced upon the medical instrument are provided. A force signal for each axis of the interface device is generated by further means, with the actuators responsive to these force signals to provide a force to each axis of the interface device for reflecting a force on the medical instrument to the member.

BEST MODE FOR CARRYING OUT THE INVENTION

Described is a method and an apparatus which uses Virtual Reality Technology including image processing, three dimensional graphics and display methods, simulated force/tactile reflection, programmed stereophonic sound generation, head/hand movement and position sensing to provide an accurate control or simulation of medical procedures, specifically: endoscopic medical procedures including, but not limited to, cholycystectomies, vasectomies, bowel resections, inguinal and bilateral hernia repairs, appendectomies, lymphadenectomies, vagotomies, bronchial surgeries, hysterectomies, nephrectomies, lysis of adhesions, tumor extraction, knee arthroscopies, and abdominal explorations; microsurgery, i.e. viteoretinal, otologic, laryngeal and stereotactic procedures; intubations, including neonatal procedures; and arterial and venous replacement and bypass methods used, for example, in treatment of innominate and subclavian occlusive disease.

The apparatus can be used to provide realistic simulations of patients on which to practice medical procedures for training and qualification purposes, to provide a means for trainees to see and feel actual (or simulated) surgeries, to display information from previously obtained medical diagnostics or image modalities (CT data, PET data, MRI data, etc.) to the surgeon overlaid on current image information during the surgery, and to provide the man-machine interface for robotic surgery.

The apparatus consists of a two or three dimensional display device, a two or three dimensional sound device, a graphics/image processing engine and storage module capable of real-time medical image generation, and programmable tactile/force reflecting mechanisms which can generate the "feel" of medical instruments and the interaction of these instruments with the anatomical simulation. The preferred embodiment of the invention is designed for simulating endoscopic medical procedures due to the minimally invasive nature of these techniques.

The preferred embodiment of this invention addresses the problems presented by the prior art by providing means for controlled, preprogrammable simulation of a medical procedure (using both active tactile feel and imagery) so that standardized practice and qualification sessions can be performed by surgeons. The same embodiment can also be used to augment the data normally delivered to the surgeon in actual endoscopic surgery, and can provide surrogate feels and imagery to surgeon trainees from actual surgeries being performed by expert surgeons.

The basic medical procedure simulation system consists of two basic functions:

(1) measuring and recording sights, sounds, and feels generated during actual surgery;

(2) accurately playing back these recorded sights, sounds, and feels and for using the recorded data to generate new information necessary to emulate the responses to alternative actions taken by a surgeon trainee.

Figure 1:
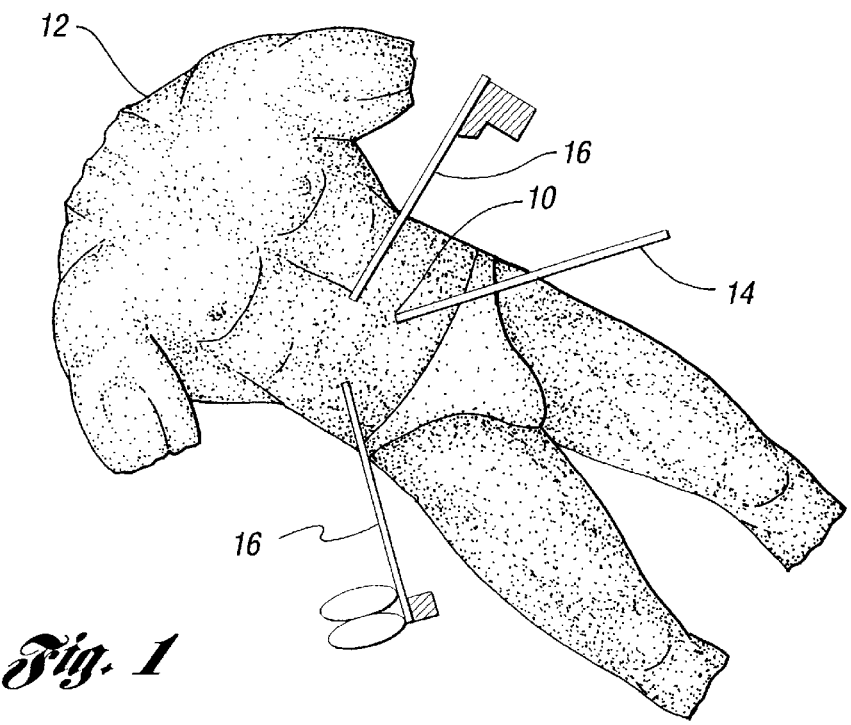
FIG. 1 shows the insertion of a scope and an instrument into a body during a laparoscopic medical procedure.
Figure 2:
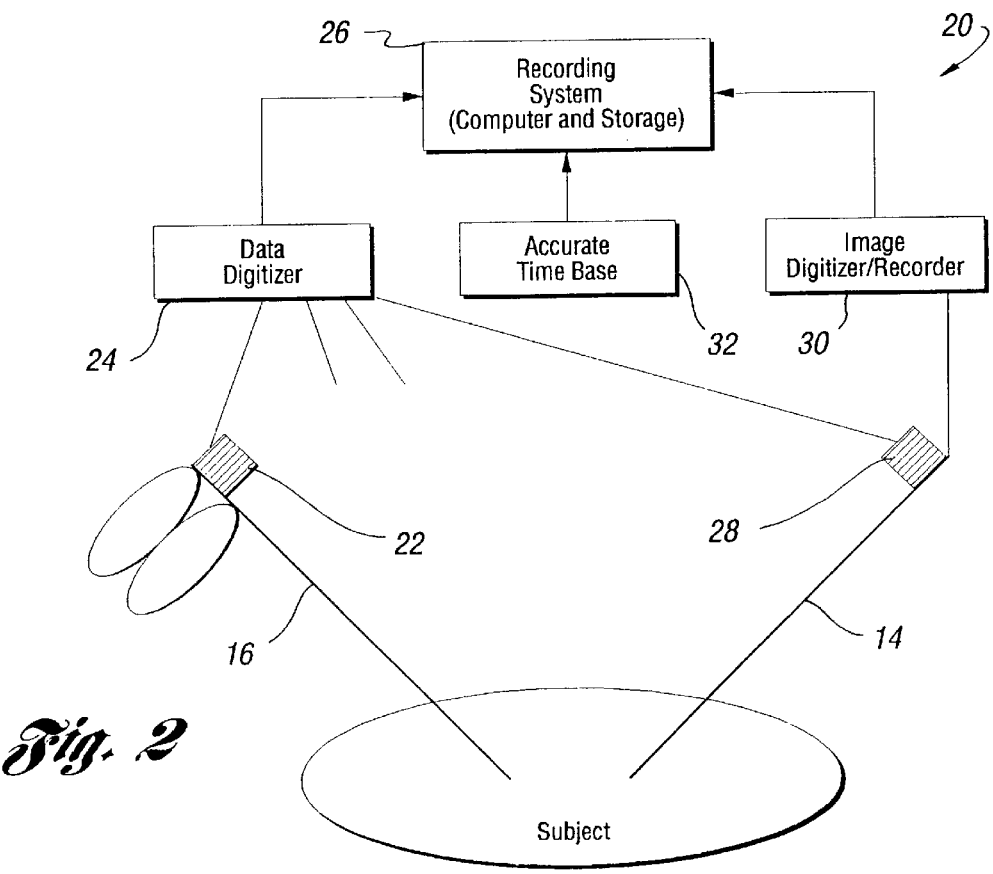
FIG. 2 is a block diagram representation of the recording apparatus.

Turning now to FIG. 2, the recording apparatus 20 that allows the critical events in a medical procedure to be measured and recorded during actual surgeries performed by expert surgeons is shown. Medical Instruments 16 having pressure and position sensors 22 are connected to a data digitizer 24. The pressure and position data from the digitizer 24 is recorded by a recording system 26 consisting of a computer and a storage subsystem. (A viewing scope 14) having pressure and position sensors 28 is connected to an image digitizer/recorder 30. The image digitizer/recorder 30 is also connected to the recording system 26. The recording system 26 can either compress and store digital image data or store analog video on a computer-controlled video cassette recorder (VCR). The non-image data is stored on digital disk or tape storage. An accurate time base 32 is also connected to the recording subsystem 26 to provide time stamps for the instrument locations, forces or pressures, and actions such as trigger actuations during the specified scope locations, forces (or pressures), and image data captured during the operation. Each data item (force, position, trigger action item or image captured) is time stamped so that it is placed accurately into the time sequence of events during surgery. The recording apparatus 20 in FIG. 2 can be directly connected to a playback apparatus (in FIG. 5) to provide immediate feedback to a trainee.

Figure 3:
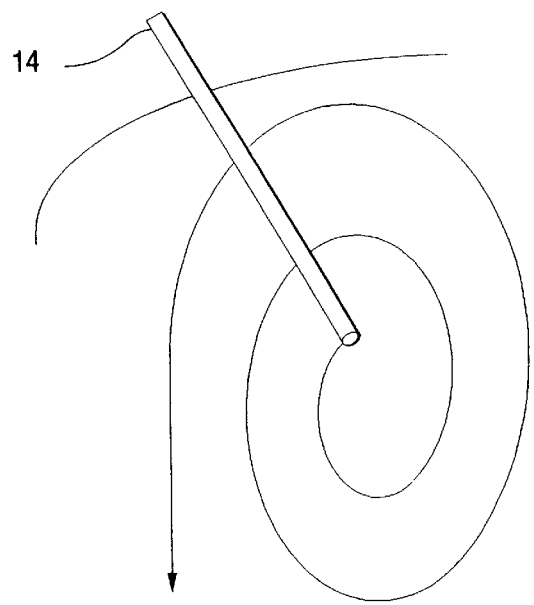
FIG. 3 depicts the systematic scanning of an anatomical feature to generate a complete imagery record.

To support the generation of data and images to accommodate various user inputs, which will be different than the mechanics implemented in the operating room and will differ from any particular surgery performed, a systematic scanning of anatomical features is performed. FIG. 3 depicts the systematic scanning of anatomical features using the scope 14 to generate a complete imagery record of organ and tissue orientation surrounding the site of medical simulation. This supports generation of in-between data and interpolated views based on recorded data.

Figure 4:
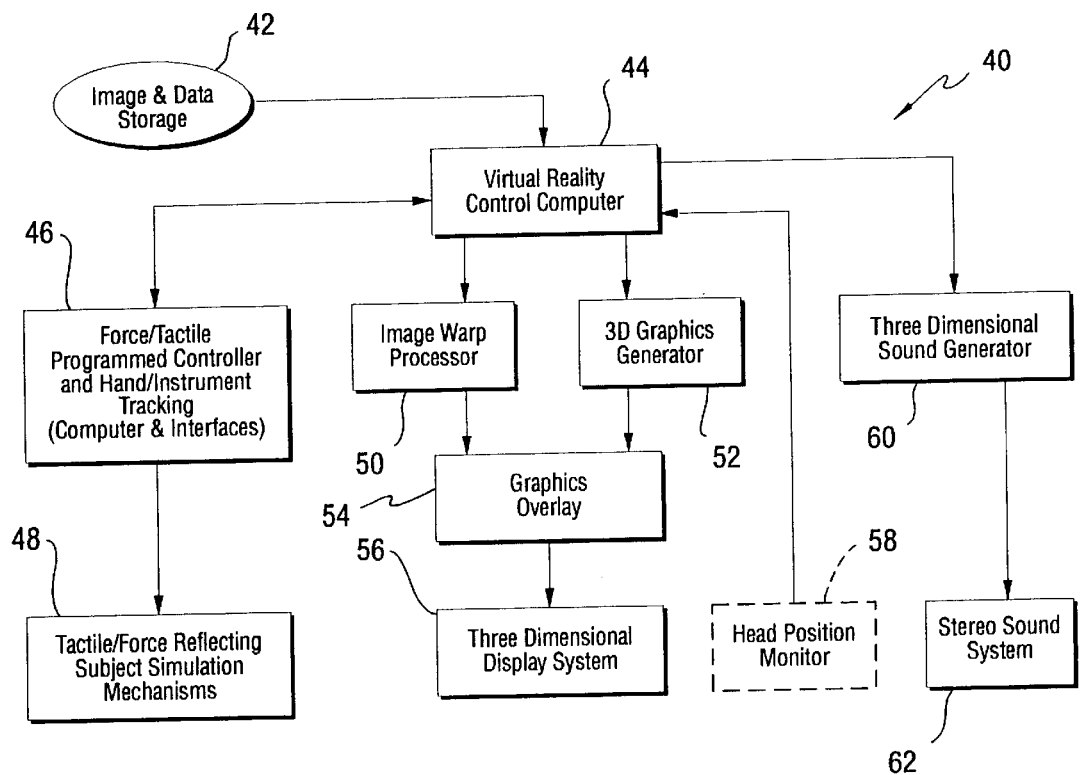
FIG. 4 is a block diagram representation of the virtual reality training/replay apparatus.

The virtual reality training/replay apparatus 40 needed to playback the recorded data is incorporated in FIG. 4. This apparatus 40 generates the virtual space which displays the time stamped and interpolated data stored in the image and data storage system 42. A virtual reality control computer 44 receives image and non-image data from the image and data storage system 42. Position, orientation, and force data are processed by the computer 44 and sent to the force/tactile programmed controller and hand/instrument tracking subsystem 46. The force/tactile programmed controller and hand/instrument tracking subsystem 46 is connected to a tactile/force reflecting subject simulation mechanism 48 in order to provide force feedback.

The virtual reality control computer 44 obtains image data from the image and data storage system 42 based on the position and orientation of the instruments. The control computer 44 processes this data and relays it to an image warp processor 50. The image warping function 50 uses morphing, defined as the correspondence of two images through corresponding polygon patches, as the means for providing interpolated images from data collected during recording sessions. A 3D graphics generator 52 is also connected to the virtual reality control computer 44 in order to generate accurate three dimensional images of endoscopic instruments. A graphics overlay unit 54 is used to overlay the three dimensional images from the 3D graphics generator 52 on the morphed video derived imagery from the image warp processor 50. The output of the graphics overlay unit 54 is fed into a three dimensional display system 56.

An optional (denoted by the dashed lines) trainee head tracking system 58 can be connected to the virtual reality control computer 44 to provide information for the three dimensional display generation function to control generation of view dependent imagery assuming that the display system 56 is a head mounted system. Alternative embodiments for the display system 56 which use more conventional display technology, such as CRTs, might not require head tracking systems 58. However, future systems are expected to replace CRT viewing of endoscope-derived image data with head-mounted three-dimensional viewing. This viewing arrangement will require the head position sensing subsystem 58.

The inclusion of a head position sensing subsystem 58 also allows the incorporation of a three-dimensional sound generation system 60. The sound generation system receives audio information from the virtual reality control computer 44 and sends this information to a sound system 62. The use of sound generation is also optional since it is not necessary in simulating endoscopic procedures.

Figure 5:
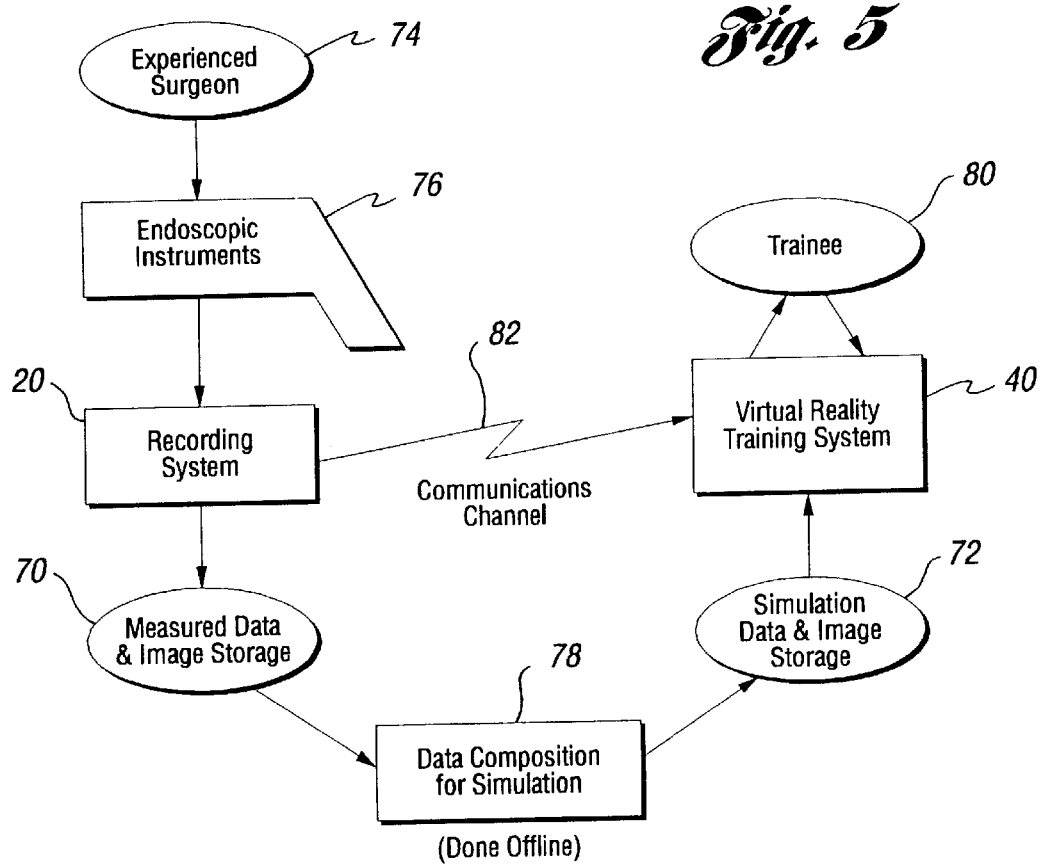
FIG. 5 is a block diagram representation of the incorporation of the recording apparatus with the virtual reality training/replay apparatus.

FIG. 5 shows how the recording apparatus 20 in FIG. 2 can be used to acquire image and manipulation data 70 which is then used to compose simulation data sets 72 for replay on the virtual reality replay apparatus 40 from FIG. 4. An experienced surgeon 74 performs an actual endoscopic medical procedure using endoscopic instruments 76. The recording system 20 is used to measure and record the sights, sounds, feels, and actions occurring during the actual medical procedure. The sights, sounds, feels, and actions data are stored in the measured data and image storage system 70. Simulation data sets 72 are formed off-line from the measured data 70 by a data composition system 78. The virtual reality training system 40 uses images and data in the simulation database 72 to allow a trainee 80 to explore this data. The trainee 80 can view, hear, and feel operations through manipulation and positioning of the simulated instruments, or based on his head location. Images or data not in the simulation database 72 are generated through interpolation between images/data items which are in the database 72 (interpolation between images is accomplished through morphing mapping predetermined image polygons between images).

FIG. 5 also shows how the recording apparatus 20 can be used to pick-up data and imagery from an in-progress medical procedure for immediate replay on the virtual reality replay/training apparatus 40. In this mode, the virtual reality replay apparatus 40 immediately receives the output of the recording apparatus 20 via a communications channel 82. Therefore, the trainee 80 does not explore the input data and imagery through manipulation, but rather experiences the data stream. This data includes the virtual forces generated by the force/tactile subsystem and applied to the trainee's hands through the simulated instruments. Thus, the trainee 80 can gain intuitive understanding of the medical procedure, including the feelings, sights, and sounds of the operation, without the risks and possible complications associated with medical intervention.

Figure 6:
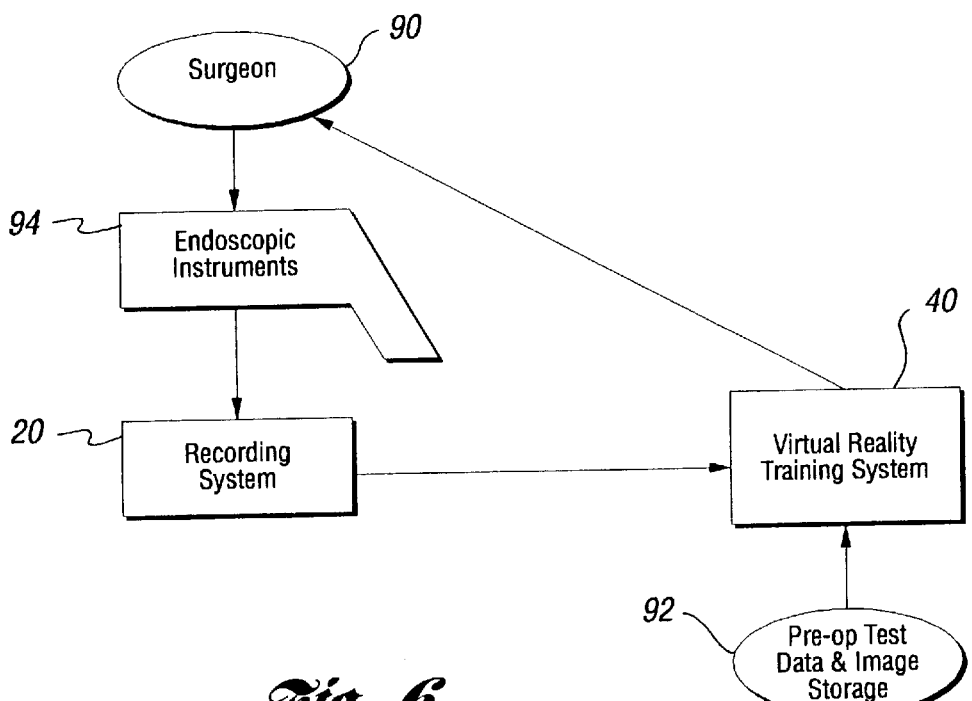
FIG. 6 is a block diagram representation of using the virtual reality replay system to provide a surgeon with preoperative imagery.

FIG. 6 shows how elements of the virtual reality replay system 40 can be used to provide the surgeon 90 with views of preoperative information and imagery 92, such as CT scans and MRI scans, to augment what is available now for endoscopic procedures (for instance, video imagery from the laparoscope). A surgeon 90 performs an actual medical procedure using endoscopic instruments 94. The recording system apparatus 20 is used to measure and record the actions and images in the instruments 94 during the procedure. The virtual reality training system 40 incorporates pre-operative test data and images 92 with the output of the recording apparatus 20. The use of virtual reality display techniques allows metabolic and anatomical structure graphics to be overlayed on the basic video imagery now available to the surgeon 90—this is especially valuable if we provide the surgeon 90 with a three dimensional viewer (such as a head-mount three-dimensional viewer) for graphically enhanced anatomical information.

Figure 7:
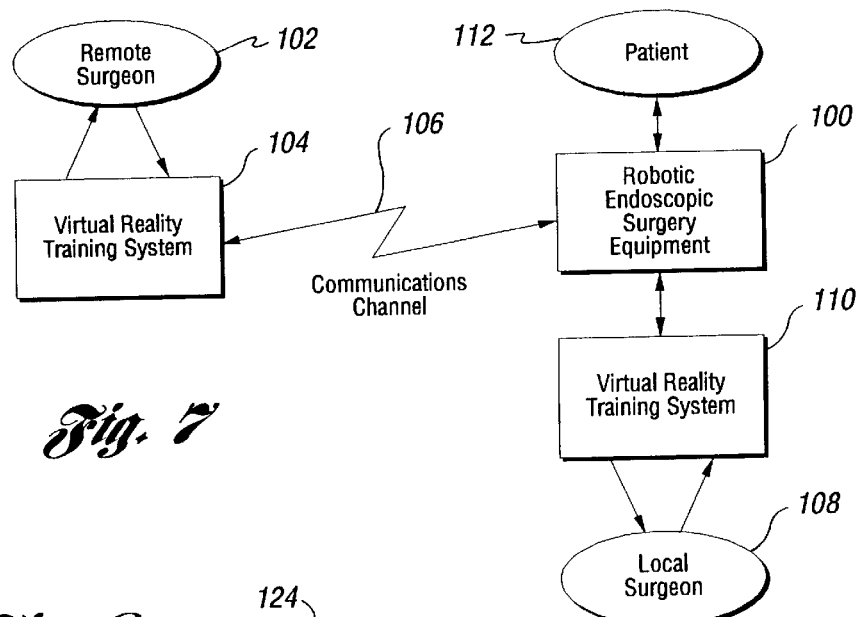
FIG. 7 is a block diagram representation of using the virtual reality system in conjunction with robotic endoscopic medical equipment.

FIG. 7 shows how the virtual reality systems described already can also be used to provide feedback from and control information to robotic endoscopic medical equipment 100. A remote surgeon's 102 instruments, viewing scope, and head position are measured and recorded by the virtual reality training system 104. This data is transmitted to the robotic endoscopic surgery equipment 100 via a communications channel 106. A local surgeon's 108 instrument, scope, and head position is also measured and recorded by a second virtual reality training system 110. The robotic instruments are controlled to perform the actions of either the remote surgeon 102 or the local surgeon 108 on the patient 112. The resulting sights, sounds, actions, and feels are experienced by both the remote surgeon 102 and the local surgeon 108. The virtual reality concept described in this document provides the means for sharing control of such robotic equipment 100 between several surgeons or trainees.

Figure 8:
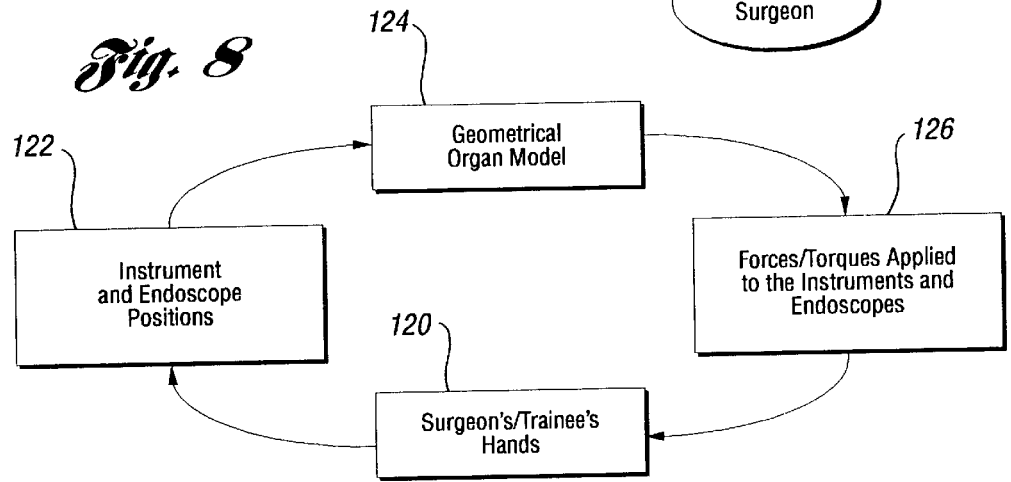
FIG. 8 is a block diagram representation of the force/tactile subsystem control concept.

The most important subsystems in the virtual reality replay apparatus are the force/tactile controller 46 and the tactile/force reflecting mechanism 48. These systems use force reflection information generated from the simulation database (or model-base) to create the feel of the medical instruments. FIG. 8 shows a control concept for creating the feel of medical instruments during a simulation. The hands 120 of a surgeon or trainee grasp and move a member representative of an instrument. The position of the instrument 122 is determined and fed into a geometric model of an organ 124. The geometric model 124 includes data representing the organ size, position, surface characteristics (in terms of elasticity, resistance to searing, slipperiness, etc.). Forces and torques are applied to the surgeon's/ trainee's hands 120 from a force/torque subsystem 126 using data from the geometric model 124. Thus, realistic feels are produced on the simulated medical instrument representing instrument-to-organ interaction forces based on the position of the instrument.

Figure 9:
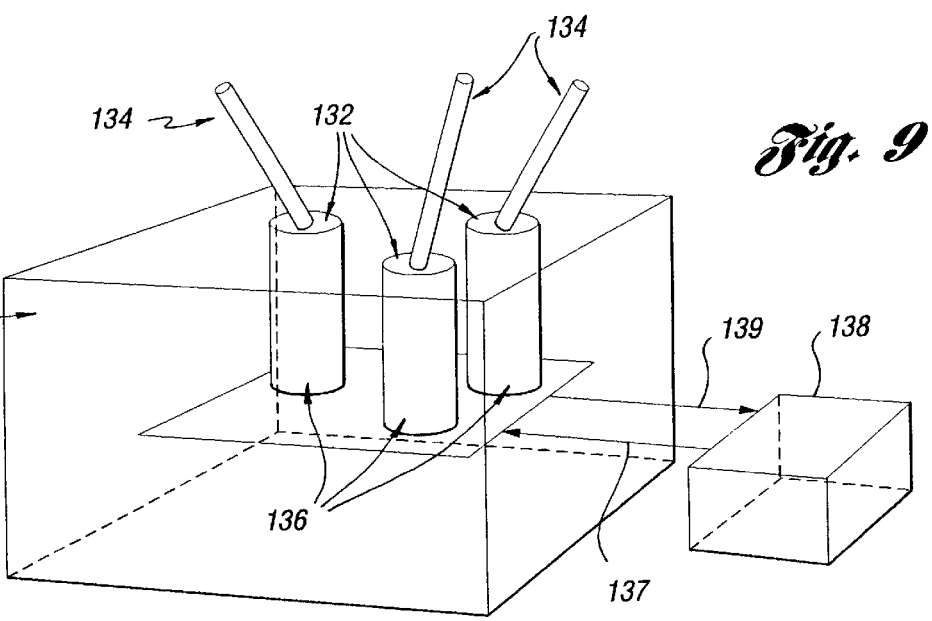
FIG. 9 is a schematic representation of the laparoscopic simulator.

An apparatus for simulating laparoscopic medical procedures shown in FIG. 9 uses the servo systems concept described in FIG. 8 to the provide force-feedback control. The apparatus consists of a box-like enclosure 130 which provides three openings 132 for insertion of instruments 134. When the instruments 134 are inserted they are clamped to four-axis devices 136 such as the force reflection mechanism 140 shown in FIG. 10. This mechanism 140 includes, in effect, a small backdrivable robot which moves in 4 degrees of freedom: 1 linear position (extension) and 3 attitudes (roll, pitch, and yaw) . This is accomplished by the extension actuator 142, roll actuator 144, pitch actuator 146, and yaw actuator 148. This mechanism 140 can translate and provide forces/torques under programmed control (generated by the modeling subsystem in FIG. 8) which feel to the trainee like the interactions characteristic of the actual medical procedure. These four-axis actuation systems are reduced implementations of universal force reflection mechanisms described in co-pending application Ser. No. 984,324, filed Dec. 2, 1992.

In operation, each of the four-axis devices 136 generate a series of signals 139 representative of the position and orientation of the corresponding instrument 134. These signals are transmitted to a controller 138 which generates a series of force commands 137 which are returned to the four-axis devices 136 to provide force feedback on the corresponding instrument 134.

The controller 138 may be a virtual reality simulation of the environment of a medical procedure, formed either artificially or based upon data collected during an actual medical procedure. The controller 138 could also represent one or more slave devices which respond to follow the actions of the instruments 134, measure the forces acting on the slave device, and transmit force commands 137 back to the four-axis devices 136.

It should be noted that there are a variety of different ways that the four-axis device could be implemented. This device could read the position of a user's hand by means of a laser tracking system and feedback forces by-urging the user's hand with jets of air. In the preferred embodiment, however, the user's hand will grip a member 134 representative of a medical instrument or another medical tool.

Figure 10:
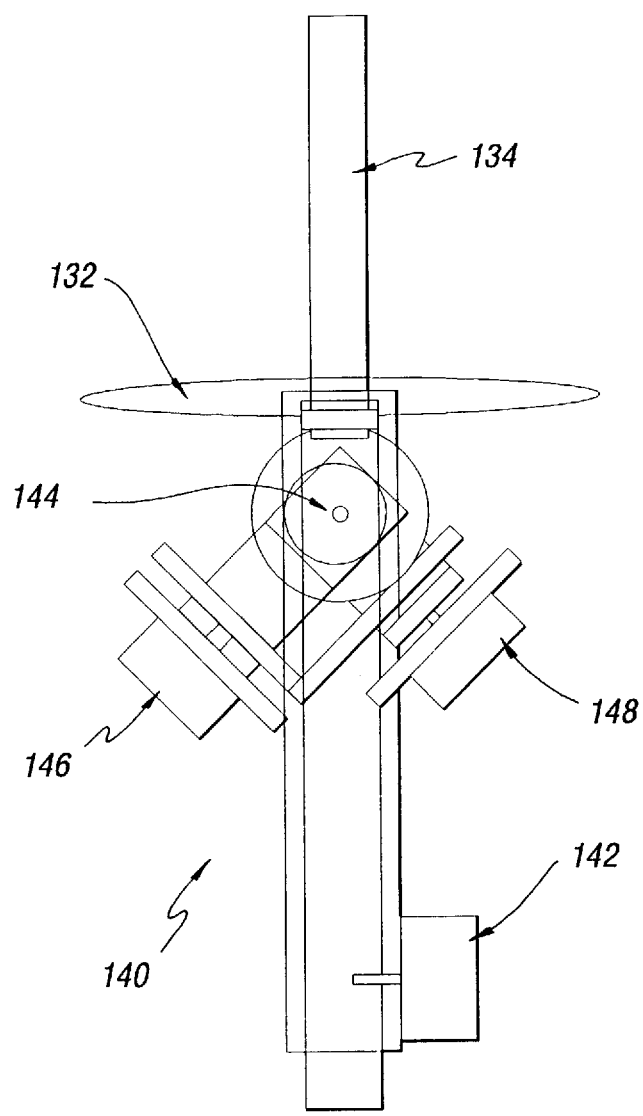
FIG. 10 shows the four-axis force reflecting module within an opening in the laparoscopic simulator.

The specific four-axis device shown in FIG. 10 is now examined in more detail. The position, orientation, velocity, and/or acceleration provided on the force reflective mechanism 140 by a member 134 is sensed and transmitted as a command to the simulation which implements a virtual reality force field. In turn, a force command is generated based on the force field value for the position, orientation, velocity, and/or acceleration of the member 134 given by the simulation. This force command is transmitted to force reflective mechanism 140. Force is then generated on the member 134 by the force reflective mechanism 140 using four small, brushless, DC servo motors. The four axis force-reflection output and four-axis orientation and position control provides the user with direct kinesthetic feedback from the virtual environment traversed. A queuing button (not shown) can be incorporated in order to actuate the instrument within the simulation or control.

The invention in its preferred embodiment is applicable to controlling a virtual or simulated medical environment. However, the invention is also well suited to the control of a remote or physical medical instrument. Further, the present invention is suited for application to any number of axes. For instance, a full six-axis interface could be used for simulating or controlling medical procedures.

While the best mode for carrying out the invention has been described in detail, those familiar with the art to which this invention relates will recognize various alternative designs and embodiments for practicing the invention as defined by the following claims.

What is claimed is:

1. A method of providing a virtual reality in response to a position and orientation of a member representative of a medical instrument, the method comprising the steps of:

providing a first medical instrument having sensors for position and pressure;

performing an actual medical procedure using the first instrument;

measuring and recording during the actual medical procedure data representative of the position and orientation of the first instrument and the pressures experienced by the first instrument;

providing a member representative of the first medical instrument;

generating an electrical signal for each of a plurality of degrees of freedom of the member as a function of the position and orientation of the member in three-dimensional space;

generating at least one virtual reality force field in response to the generated electric signals as a function a the recorded position and pressures experienced by the first instrument;

generating a force signal for each degree of freedom as a function of the force field; and directing a force on the member for each force signal, the generated forces providing the virtual reality.

2. The method of claim 1 wherein the actual medical procedure includes a pre-medical diagnostic procedure.

3. The method of claim 1 wherein the generated forces are tactile forces.

4. The method of claim 1, further including the steps of:

providing a second instrument including a sensor for gathering images of the actual medical procedure;

storing data representative of the images in a time-coordinated manner along with the recorded position, orientation and pressure data; and replaying the images in a time-coordinated manner in conjunction with the direction of the forces on the member, the combination of the generated forces and the images providing the virtual reality.

5. The method of claim 1, further including the steps of:

storing data representative of images obtained from a previously obtained medical diagnostic procedure; and replaying the images in conjunction with the direction of the forces on the member, the combination of the generated forces and the images providing the virtual reality.

6. The method of claim 5, wherein the data representative of images obtained from a previously obtained medical diagnostic procedure includes CT data.

7. The method of claim 5, wherein the data representative of images obtained from a previously obtained medical diagnostic procedure includes PET data.

8. The method of claim 5, wherein the data representative of images obtained from a previously obtained medical diagnostic procedure includes MRI data.

9. The method of claim 4, wherein the step of storing data representative of the images includes storing such data at regular intervals, and interpolating the data between the intervals during the replaying of the images.

10. The method of claim 1, wherein the step of measuring and recording the position, orientation and pressure data includes measuring and recording such data at regular intervals, the method further including the step of interpolating the data between the intervals during the generation of the virtual reality force field.

11. A system for providing a virtual reality in response to a position and orientation of a member representative of a medical instrument, the system comprising:

a first medical instrument including a plurality of sensors outputting electrical signals representative of the a position and orientation of the instrument, and the pressure experienced by the instrument, during use in an actual medical procedure;

a digitizer for converting the electrical signals received from the first instrument into a plurality of position, orientation, and pressure data sets;

a recorder for storing the data sets;

a member including a tactile/force reflecting mechanism responsive to the position and orientation of the member;

a programmed controller interfaced to the tactile/force reflecting mechanism for providing force feedback to the member; and a virtual reality control computer in operative communication with the recorder and programmed controller, the computer being operative to map the position and orientation of the member into the stored data sets and determine any interactions therebetween, thereby enabling a user to experience the position and orientation of the instrument, and the pressure experienced by the instrument, through force feedback provided to the member.

12. The system of claim 11, further including a second medical instrument including:

a second instrument including a sensor for gathering images of the actual medical procedure; and wherein the virtual reality control computer is further operative to map the images into the stored data sets, thereby enabling the user to view the position and orientation of the instrument while experiencing the force feedback provided to the member.

13. The system of claim 12, further including a three-dimensional display system.

14. The system of claim 12, further including an image warp processor operative to interpolate between two of the images through corresponding polygon patches.

15. The system of claim 12, further including means for overlaying imagery previously obtained from a medical diagnostic procedure.

16. The system of claim 11, further including a time base for providing time stamps associated with instrument locations, forces and pressures.

17. The system of claim 11, further including playback apparatus incorporating a member representative of the first medical instrument and a direct interface to the recorder, thereby providing immediate feedback of the actual medical procedure to a trainee.

18. The system of claim 11, further including means for queuing the first instrument into the virtual reality.

19. A method of providing a virtual reality in response to a position and orientation of a member representative of a medical instrument, the method comprising the steps of:

storing a geometrical model of an organ, including the size, position, and one or more surface characteristics associated therewith, providing a member representative of a medical instrument;

generating an electrical signal for each of a plurality of degrees of freedom of the member as a function of the position and orientation of the member in three-dimensional space;

generating at least one virtual reality force field in response to the generated electric signals as a function of the size, position, and surface characteristics of the organ;

generating a force signal for each degree of freedom as a function of the force field; and directing a force on the member for each force signal, the generated forces providing the virtual reality.

20. The method of claim 19, wherein one of the surface characteristics is elasticity.

21. The method of claim 19, wherein one of the surface characteristics is resistance to shearing.

22. The method of claim 19, wherein one of the surface characteristics is slipperiness.

* * * * *